(12) United States Patent
Kuczynski et al.

(10) Patent No.: US 9,593,846 B2
(45) Date of Patent: Mar. 14, 2017

(54) OXY-FUEL PLANT WITH FLUE GAS COMPRESSION AND METHOD

(75) Inventors: Konrad Jerzy Kuczynski, Strathclyde (GB); David James Adams, Sussex (GB)

(73) Assignees: DOOSAN POWER SYSTEMS LIMITED, Crawley (GB); POWER SYSTEMS SYNETICS LIMITED, Horsham (GB)

( * ) Notice: Subject to any disclaimer, the term of this patent is extended or adjusted under 35 U.S.C. 154(b) by 0 days.

(21) Appl. No.: 13/992,989

(22) PCT Filed: Dec. 9, 2011

(86) PCT No.: PCT/GB2011/052449
§ 371 (c)(1),
(2), (4) Date: Jan. 27, 2014

(87) PCT Pub. No.: WO2012/076902
PCT Pub. Date: Jun. 14, 2012

(65) Prior Publication Data
US 2014/0144355 A1    May 29, 2014

(30) Foreign Application Priority Data
Dec. 10, 2010    (GB) .................................. 1021023.5

(51) Int. Cl.
*F23C 9/00*    (2006.01)
*F23C 9/08*    (2006.01)
(Continued)

(52) U.S. Cl.
CPC ................ *F23C 9/00* (2013.01); *F22B 35/00* (2013.01); *F23C 9/08* (2013.01); *F23L 7/007* (2013.01);
(Continued)

(58) Field of Classification Search
CPC ... Y02E 20/344; Y02E 20/328; Y02E 20/185; F23L 7/007; F23L 2900/07001;
(Continued)

(56) References Cited

U.S. PATENT DOCUMENTS 5,075,608 A    12/1991 Erdman et al.
5,244,147 A *    9/1993 Furukawa ..................... 110/163
(Continued)

FOREIGN PATENT DOCUMENTS

| EP | 1 816 103 A2 | 8/2007 |
| WO | 2007/079381 A2 | 7/2007 |
| WO | 2008/149284 A2 | 12/2008 |

OTHER PUBLICATIONS

International Preliminary Report on Patentability dated Jun. 12, 2013 issued in corresponding PCT application No. PCT/GB2011/052449.
(Continued)

*Primary Examiner* — David J Laux
(74) *Attorney, Agent, or Firm* — Sughrue Mion, PLLC

(57) ABSTRACT

A method of and control apparatus for operation of a boiler plant are described. The boiler plant has a furnace volume, an oxyfuel firing system for oxyfuel combustion of fuel in the furnace volume, and a compression system for compression of gases exhausted from the furnace volume after combustion. The method and control apparatus are characterized by the step of controlling mass flow of gases through the compression system as a means to control pressure within the furnace volume. This invention relates to both single and multi unit arrangements.

9 Claims, 11 Drawing Sheets

(51) Int. Cl.
*F22B 35/00* (2006.01)
*F23L 7/00* (2006.01)
*F23N 3/08* (2006.01)

(52) U.S. Cl.
CPC ........... *F23N 3/085* (2013.01); *F23J 2215/50* (2013.01); *F23J 2900/15061* (2013.01); *F23L 2900/07001* (2013.01); *F23N 2025/06* (2013.01); *Y02E 20/344* (2013.01)

(58) Field of Classification Search
CPC ......... F23L 2900/07005; F23J 2215/40; F23N 2025/04; F23N 2025/06; F22B 35/00
See application file for complete search history.

(56) References Cited

U.S. PATENT DOCUMENTS

| | | | |
|---|---|---|---|
| 7,293,718 B2 * | 11/2007 | Sigafus et al. | 165/267 |
| 8,636,500 B2 * | 1/2014 | Kloosterman et al. | 431/6 |
| 2009/0260585 A1 | 10/2009 | Hack et al. | |
| 2009/0325010 A1 * | 12/2009 | Kirklin | 429/22 |
| 2010/0081099 A1 | 4/2010 | Kloosterman et al. | |
| 2011/0304155 A1 * | 12/2011 | Hoffmann et al. | 60/659 |

OTHER PUBLICATIONS

UK Search Report dated Mar. 24, 2011 issued in corresponding UK Application No. GB1021023.5.

* cited by examiner

OXY-FUEL PLANT WITH FLUE GAS COMPRESSION AND METHOD

CROSS-REFERENCE TO RELATED APPLICATIONS

This application is a National Stage of International Application No. PCT/GB2011/052449, filed on Dec. 9, 2011, and claims priority from GB 1021023.5 filed Dec. 10, 2010, at the United Kingdom Intellectual Property Office, the disclosure of which are incorporated herein in their entireties by reference.

The invention relates to a control system for and a method of operation of a boiler plant such as a thermal power plant having an oxyfuel firing capability. The invention in particular relates to a control system for and a method of operation of the combustion furnace and to maintain correct flows through the thermal power plant suitable for stable and safe operation in response to varying demand and conditions. This invention relates to both single and multi unit arrangements Most of the energy used in the world today is derived from the combustion of fossil fuels, such as coal, oil, and natural gas, for example in thermal power generation plants. The combustion of such fossil fuels produces a large volume of $CO_2$ which was conventionally vented to atmosphere. Atmospheric $CO_2$ is recognized as a significant greenhouse gas. It has been established that one of the main causes of global warming is the rise in greenhouse gas contamination in the atmosphere due to anthropological effects. The limitation of further release of greenhouse gases and into the atmosphere is generally recognized as a pressing environmental need. The successful implementation of strategies to reduce atmospheric $CO_2$ emissions from the combustion of fossil fuels is important if the continued use of fossil fuels in many applications, including power generation, is to be possible.

Oxyfuel firing is a means of firing the fuel with an oxygen enriched comburant gas. In conventional fossil fuel fired combustion equipment for example in boilers for steam generation the oxygen required to burn the fuel is supplied by using atmospheric air as a comburant gas. In the case of oxyfuel firing a supply of gas with a higher oxygen content, and in particular a mixture of substantially pure $O_2$ and recycled $CO_2$, is used as a comburant gas. To effect this, the combustion air supply must first be separated prior to supply to the furnace in a suitable air separation unit (ASU). Only the separated gaseous oxygen is intended for supply to the combustion process. The separated nitrogen/argon gaseous mix may be vented to atmosphere. Within the air separation unit processes the liquid oxygen may be cryogenically stored in the embedded liquid oxygen (LOX) storage facility. Liquid air may be stored in the embedded liquid air (LA) storage facility.

The oxyfuel combustion process seeks to produce combustion products that are highly concentrated in $CO_2$ and in particular consist essentially of $CO_2$ and water to facilitate carbon capture and mitigate the $CO_2$ emissions. The $CO_2$ produced is extracted from the system via $CO_2$ compressors by means of which the $CO_2$ is compressed for storage.

The state of the art in relation to the oxyfuel combustion process includes various references covering the development of both the fundamental concepts of the Oxyfuel cycle, the mechanical elements associated with the Oxyfuel cycle and refinements of those elements to improve efficiency. For example US patent publication US2009/260585 and International patent publication WO2008/149284 describe a plant adapted for oxyfuel operation and with a capability for the extraction, compression and storage of exhaust $CO_2$ via $CO_2$ compressors.

These references do not specifically consider mechanisms for effective control of the furnace pressure, or how such mechanisms might be affected by the particular requirements of the oxyfuel combustion process. A knowledge of how the particular key variables within the gas system of an oxyfuel cycle, and in particular the furnace pressure, may be controlled has not been properly established by skilled addressees in power plant design and operation or by those skilled in the art of power station control system design.

Control of combustion conditions is important for safe, efficient and flexible operation of a thermal power plant. In a conventional air fired power plant the maintenance of correct combustion conditions is normally achieved by control of the forced draught (FD) and induced draught (ID) fans such that the total flow of combustion air into the furnace from the environment to match fuel flow is controlled by the FD fan whilst control of furnace pressure to prevent leakage of combustion products and unburned fuel into the boiler house is achieved by modification of the mass flow that is extracted from the furnace by the ID fan to the environment.

Oxyfuel power plants may operate in both 'conventional' air firing mode and in oxyfuel mode where process gas is cycled around the system with a fraction of the gas stream being extracted and passed through a $CO_2$ compression system. Current oxyfuel plants and test rigs are known to use conventional control designs used for air firing mode to control the furnace pressure, by changing the mass flow through the ID fan, and apply this strategy to the oxyfuel mode. In oxyfuel mode at any instant in time the ID fan extracts a mass of gas from the furnace and this methodology is initially effective as the mass extracted form the furnace at that instant in time is controlled to match changes in furnace pressure. However due to the recycling of gas within the oxyfuel process, the nett difference between the mass extracted by the ID fan and the mass extracted by the $CO_2$ compressors is returned to the furnace through the re-cycling duct. Thus if the mass of gas flow through the $CO_2$ compressor remains constant the effect of changing the mass of gas flow through the ID fan has only a very short transient effect on furnace pressure and any longer term excursion in furnace pressure will remain unaltered by changing ID fan gas flow based on furnace pressure excursions, in the conventional method used on air fired boilers. Currently a solution to this problem used by skilled addressees in the art of power station design and control is to continually vent a proportion of the rich in $CO_2$ gas stream from the recycle duct to the chimney.

Application of this conventional control strategy to the oxyfuel mode may therefore have some effectiveness. However it does not address the particular technical issues raised in relation to the gas system of an oxyfuel cycle and as a result may produce a number of unsatisfactory consequences which may include:

The need for venting constantly a proportion of the rich in $CO_2$ flue gas from the system to the atmosphere. This negates the very purpose of having an oxyfuel firing mode with compression of rich in $CO_2$ flue gases, which is to allow their capture for sequestration rather than to vent to atmosphere.

The need for the combustion firing systems to be 'slowed down' in order to reduce furnace pressure excursions. This leads to less flexible power plant design.

Excessive and potentially damaging excursions in furnace pressure associated with sootblowing events, often resulting in plant trips unless further large scale increases in venting are applied at the onset of sootblowing.

Therefore the need for a control methodology that is more properly based on a knowledge of how the particular key variables within the gas system of an oxyfuel cycle, and in particular the furnace pressure, may be controlled, exists.

Furthermore, additionally it is recognised that the plant elements in the oxyfuel cycle impose extra constraints and requirements which the control system design must satisfy.

There is the need to develop integrated control designs and methods adapted to the particular requirements of operation in oxyfuel mode for meeting these requirements in a safe and efficient manner. These needs for a safe solution are clearly recognised by the power plant owners. As a result the common requirements for the technology suppliers might include:

25 years lifetime of a plant,

High $CO_2$ capture rates targets, improved efficiency, combustion flexibility and power plant flexibility.

In accordance with the invention in a first aspect there is provided a method of operation of a boiler plant such as a thermal power plant having a furnace volume, an oxyfuel firing system for oxyfuel combustion of fuel in the furnace volume, and a compression system for compression of gases exhausted from the furnace volume after combustion, the method characterized by the step of controlling mass flow of gases through the compression system as a means to control pressure within the furnace volume.

The invention recognises that the use of conventional control designs used for air firing mode may no longer be desirable for operation in the oxyfuel mode. In particular the invention recognises that the requirement to simultaneously operate at the correct furnace pressure and with the correct gas mass flow through a fuel supply system such as a milling system cannot be met using designs based on the assumption of passing a fixed fraction of gas to the compressors of the exhaust gas compression system. The invention recognises that use of the ID fan for furnace pressure control is no longer effective for operation in oxyfuel mode. The invention recognises that the implementation of this assumption in control schemes for an oxyfuel cycle would result in unacceptable plant conditions which could compromise the efficiency and safety of both the plant and personnel.

The invention recognises that the known prior art use of a continuous venting of perhaps 10% or more of the concentrated $CO_2$ gas from the closed gas recycling system of an oxyfuel plant to stabilise furnace pressure control is unnecessary and is due to the application of furnace pressure control concepts which are suitable only for conventional air firing.

Instead, the invention makes use of the $CO_2$ compressors by means of which the $CO_2$ is compressed for storage and which form part of the $CO_2$ compression and storage system of the oxyfuel plant to control the mass balance through the furnace and thereby to control the pressure in the furnace volume. More specifically, the method is a method of operation of a boiler plant such as a thermal power plant with oxyfuel firing capability and having a furnace volume, an oxyfuel firing system for oxyfuel combustion of fuel in the furnace volume, and a compression and storage system for compression for storage of the rich in $CO_2$ gases exhausted from the furnace volume after oxyfuel combustion, the method being characterized by the step of controlling mass flow of gases through the compressors of the said compression and storage system as a means to control pressure within the furnace volume.

The use of the compressors of the compression and storage system of the oxyfuel plant circumvents the requirement exemplified in the prior art to use the ID fan(s) for this purpose. As a result, the use of the integrated control system outlined in the invention circumvents the need for a continuous bleed of concentrated $CO_2$ gas to the chimney vent in order to stabilise furnace pressure thereby reducing the carbon footprint and emissions of the plant.

Instead therefore, in accordance with the method of the invention, the compression system which is provided for compression for storage of the oxyfuel combustion products that are highly concentrated in $CO_2$ is operatively fluidly linked to the furnace volume so that gas flow into the compressors of the compression system may be varied as a means to control furnace pressure. In particular, the control of gas flow through the compression system may be used as a control parameter to vary furnace pressure in a coherent and stable fashion to produce fast, accurate responses to changes in operating conditions in response to changes in load demand.

Thus, the invention comprises the step of a controlled modulation of mass flow of the gases being compressed for storage through the compression system as a control parameter to control the mass balance in the system and thus the pressure within the furnace volume. Preferably the step of a controlled modulation of mass flow of the gases through the compression system is the primary means by which to control pressure within the furnace volume.

In a particular case relative to certain prior art systems the invention comprises a method step that is an alternative to the use of flow through the ID fan(s) and/or venting to atmosphere as a control step to control pressure within the furnace volume. Preferably it follows that in accordance with the method of the invention mass flow rates through the ID fan(s) and venting flow through the ID fan(s) to atmosphere is not used in any way as a control step to control pressure within the furnace volume.

Although the invention admits the possibility of venting rich in $CO_2$ exhaust gases to atmosphere on an occasional basis for particular purposes and/or in response to particular scenarios, a constant venting of rich in $CO_2$ exhaust gases to atmosphere is not a requirement of the method, and is preferably not carried out as part of the method.

The oxyfuel combustion process seeks to produce combustion products that are highly concentrated in $CO_2$ and in particular consist essentially of $CO_2$ and it follows that the compression system used in accordance with the invention as a means to control pressure within the furnace volume will typically comprise one or more $CO_2$ compressors for the compression of $CO_2$ exhausted from the furnace volume after combustion of the fuel.

The compression system may also consist of at least one cooler or heat exchanger for re-cooling compressed $CO_2$ during and/or after the compression.

In a simple embodiment of the method of the invention effective control of furnace pressure may be achieved at least in part by modulating the mass flow of gas through the compressors. For example the mass flow of gas through the compressors may be modulated at least in part directly by direct control of compressor operation. The mass flow through the compressors may thus be directly modulated to effect control of mass balance through the furnace and thus furnace pressure.

This fundamental principle could optionally be achieved via a simple pressure control loop adjusting the compressor speed as a means to effect dynamic control and modulation of furnace pressure and/or by adjusting an inlet flow control device and/or by other functionally related methods.

Thus, in a simple embodiment of the method of the invention effective control of furnace pressure is achieved at least in part by a direct modulation of mass flow of gas through the compressors. In a preferred embodiment control of furnace pressure may be achieved substantially entirely by a direct modulation of mass flow of gas through the compressors. However, other methods of varying the gas flow rate at the compressor inlet may be used additionally or alternatively to contribute to the desired effect without departing from the principles of the invention.

The method thus in particular comprises a method of dynamic adjustment of furnace pressure by real time determination of a mass flow rate which will tend to achieve or maintain a desired furnace pressure and by dynamic adjustment of the mass flow rate to the desired mass flow rate so as to tend to achieve or maintain the desired furnace pressure.

The specific method by means of which a desired mass flow rate of gas through the $CO_2$ compression system is achieved is not critical to the invention. There are different ways to realize a variation in mass flow rate of gas through the compressors system that is extracted from the oxyfuel process. Below are written examples of possible but not only way of implementing the invention:

For example the mass flow of the compression system can be reduced or increased by reduction or increase of power to the compressors.

Secondly the mass flow of the compression system can be reduced or increased by control means such as inlet guide vanes or by a separate control damper.

In case of a compression system consisting of plural compressors or compressor trains in parallel, the shut down or partial shut down of or reduction of mass flow through at least one compressor could be used to achieve a reduction of the mass flow through the compression system.

Modification of the mass flow that is extracted from the system could be achieved by modulation of recycled $CO_2$ mass flow, where $CO_2$ gas is recycled as drawn on FIG. 10.

In a multi unit arrangement where each unit is Oxyfuel boiler and all units under consideration are producing rich in $CO_2$ flue gas, and all units are connected to common flue gas duct that is having one or more $CO_2$ compression systems installed, the invention could be realized by modification of the mass flow that is extracted from the each unit system by a control damper that controls mass flow extracted from each unit to the collector individually for each unit to control each furnace pressure, and the mass flow through $CO_2$ compression system is equal to a sum of mass flows extracted from each unit. In this possible arrangement flow through each $CO_2$ compression systems (one or more) may be modulated to satisfy required total mass flow to be removed from the gas collector, and or modulated to achieve additional benefits i.e. reduce total works power on $CO_2$ compression system, or as an another example in case when $CO_2$ compression system will be paired with one or more oxyfuel units flow will be modulated to achieve unit sent out demand. This possible realization is drawn on FIG. 11.

Any combinations of some or all of possible realisations mention above could coexist in one system simultaneously to apply this invention in the oxyfuel system.

Dynamic performance may be improved by the optional inclusion of a manifestation of feedforward type control calculation into the step of determination of a desired mass flow rate of gas through the compressors.

Dynamic performance may be improved by the optional inclusion of non-linear compensation terms into the step of determination of a desired mass flow rate of gas through the compressors.

In a preferred refinement of the method a determination is made of air leakage from the furnace and account is additionally taken of this in determining the extraction flow required to maintain the correct value of furnace pressure.

In a refinement of the method, multiple points may be provided within the firing system for the injection of oxygen for oxyfuel firing, and the method may include modulation of oxygen mass flow at and between these multiple points as a control parameter for control of the operating characteristics of the furnace system.

In accordance with the invention at its most general control of furnace pressure may be achieved by modulating the mass flow of gas through the compressors.

Additional process variables that may be employed to optimize performance may include, in any combination:
fuel firing rate;
oxygen content of furnace exit gas;
recycled gas flow to the combustion system;
oxygen injection flow;
compressor supply pressure.

The method of the first aspect of the invention preferably comprises a method of dynamic adjustment of furnace pressure by real time determination of being a mass flow rate which will tend to achieve or maintain a desired furnace pressure and by dynamic adjustment of the mass flow rate to the desired mass flow rate so as to tend to achieve or maintain the desired furnace pressure in conjunction with dynamic adjustment of one or more of the above or other parameters to tend to optimize dynamic firing performance.

The method of the invention finds application in operation of a boiler plant such as a thermal power plant having an oxyfuel capability, where process gas is cycled around the system with a fraction of the gas stream being extracted and passed through a $CO_2$ compression system for subsequent storage, and makes use of the mass flow through the compressors of the compression and storage system as a control parameter for furnace pressure. Oxyfuel plants may typically operate in both 'conventional' air firing mode and in oxyfuel firing mode. Oxyfuel plants may operate in transition between the two modes. The method of the invention is preferably applied to such systems at least in oxyfuel firing mode.

In accordance with the invention in a further aspect, a boiler plant apparatus, and for example a power generation system of a thermal power plant apparatus comprises a furnace volume, an oxyfuel firing system for oxyfuel combustion of fossil fuel in the furnace volume, and a compression system for compression of gases exhausted from the furnace volume after combustion, and is characterized by provision of a control system adapted to control the mass flow of gases through the compression system as a means to control pressure within the furnace volume, for example in conjunction with co-ordinated changes in firing demand.

As will be familiar a boiler plant such as a thermal power plant with oxyfuel firing capability will include a furnace volume, an oxyfuel firing system for oxyfuel combustion of fuel in the furnace volume, and a compression and storage system for compression for storage of the rich in $CO_2$ gases exhausted from the furnace volume after oxyfuel combustion. The apparatus of the invention is characterized by provision of a control system to modulate the mass flow of such gases through the compressors of the said compression and storage system as a means to control pressure within the furnace volume.

The control system preferably provides for effective control of furnace pressure to be achieved at least in part by a direct modulation of mass flow of gas through the compressors. The mass flow of gas through the compressors may be modulated at least in part directly by direct control of compressor operation and the control system is preferably adapted to effect this. In a preferred embodiment control of furnace pressure may be achieved substantially entirely by a direct modulation of mass flow of gas through the compressors and the control system is preferably adapted to effect this. However, other methods of varying the gas flow rate at the compressor inlet may be used additionally or alternatively to contribute to the desired effect.

Preferably the control system is adapted to dynamically adjust the furnace pressure by real time determination of a desired mass flow rate of gas through the compressors being a mass flow rate which will tend to achieve or maintain a desired furnace pressure and by dynamic adjustment of the mass flow rate to the desired mass flow rate so as to tend to achieve or maintain the desired furnace pressure.

Other preferred features of the thermal power plant of the second aspect of the invention will be understood by analogy to the method of the first aspect of the invention.

A thermal power plant power generation system in accordance with the second aspect of the invention may be provided with a modulated vent damper from the induced draught fan (ID fan) to the chimney to remove gases from the furnace volume. In such a case the method of the first aspect of the invention may optionally include a step of ID vent control to minimise positive pressure excursions resulting from events such as a rapid increase in firing rate, loss or partial loss or rapid partial shutdown of one or more compressors. The apparatus of the second aspect of the invention may optionally include ID vent control means to effect this, for example comprising a selectively operable closure assembly that allows a variable proportion of the $CO_2$ to be vented at the ID fan.

However in the preferred case control of flow through the ID fan(s) and/or venting flow through the ID fan(s) to atmosphere is not used as a primary control step to control pressure within the furnace volume.

An oxyfuel boiler plant power generation system in accordance with the second aspect of the invention may be provided with a flue gas chimney to vent flue gases to atmosphere. In such a case the method of the first aspect of the invention may optionally include chimney vent control to vent gas to the chimney to minimise positive pressure excursions, for example by controlled opening of a chimney isolation damper assembly. The apparatus of the second aspect of the invention may optionally include a chimney vent system and vent control means to effect this, for example comprising a selectively openable chimney isolation damper assembly that allows all or some of the $CO_2$ to vent to the chimney.

For example the compression system may comprise a bypass that allows all or some of the $CO_2$ to bypass the compressor(s), which for example leads into the flue gas chimney downstream of the $CO_2$ compression system. This damper assembly or bypass can also be advantageous for start-up or shut down of the plant as well as for plant operation during maintenance of the compression system.

An oxyfuel boiler plant power generation system in accordance with the second aspect of the invention may be provided with systems where a modulated vent (or air intake) system upstream forced draught fan (FD fan) is used. In such a case the method may optionally include a step of FD vent control to minimise negative pressure excursions resulting from events such as a rapid decrease in firing rate, start-up or rapid increase in speed or power of one or more compressors. The apparatus of the second aspect of the invention may optionally include FD vent control means to effect this, for example comprising a selectively operable inlet closure assembly that allows additional air from the environment to be admitted into the suction of the FD Fan. In addition the invention recognises that optionally and either in addition or as an alternative to the above invention, a variable proportion of $CO_2$ rich gas may be injected into the recycled gas flow for the same purpose of limiting negative going excursions in furnace pressure. This possible embodiment is drawn on FIG. 12.

The invention develops the principles for integrated designs and strategies to avoid issues which arise where controls developed for air firing are unsuitably applied to oxyfuel firing and to provide safe and efficient operation of an oxyfuel plant in a manner which simultaneously meets all the operating requirements of the oxyfuel cycle.

In particular the invention recognises how these principles may be realised in practice.

In particular the invention recognises the importance of air leakage on the operation and controllability of the plant and describes methods to avoid associated problems.

In particular the invention recognises that different points for the injection of oxygen may be used to change the efficiency, control and operating characteristics of the plant.

In particular the invention recognises key operational differences between air firing and oxyfuel cycle operation. In the case of an air firing cycle the scale of interaction between key control variables is limited—allowing the use of simple and independent control loop structures. However the increased level of interaction in an oxyfuel cycle operating without venting necessitates an integrated approach to the control of all plant elements within the overall oxyfuel fuel and gas system if excessive excursions in key process variables are to be avoided.

In particular the invention recognises that, by such integration of the overall control, a number of benefits may be achieved A significant reduction or elimination of the need for venting, thereby reducing environmental impact Improved control of combustion resulting in improved thermal efficiency A reduction in the level of potentially damaging excursions in furnace gas pressure The ability to achieve and maintain maximum flexibility in load response The invention will now be described by way of example only with reference to FIGS. 1 to 12 of the accompanying drawings in which.

An example embodiment of the invention is described that develops a set of integrated control schemes which overcome fundamental problems in the control of an oxyfuel cycle and are able to simultaneously meet the various process conditions required to operate the plant in a safe and efficient manner. The embodiment of the invention also recognises the important role played by air leakage in the overall performance and controllability of the process and describes example methods to deal with these factors.

Figure 1:
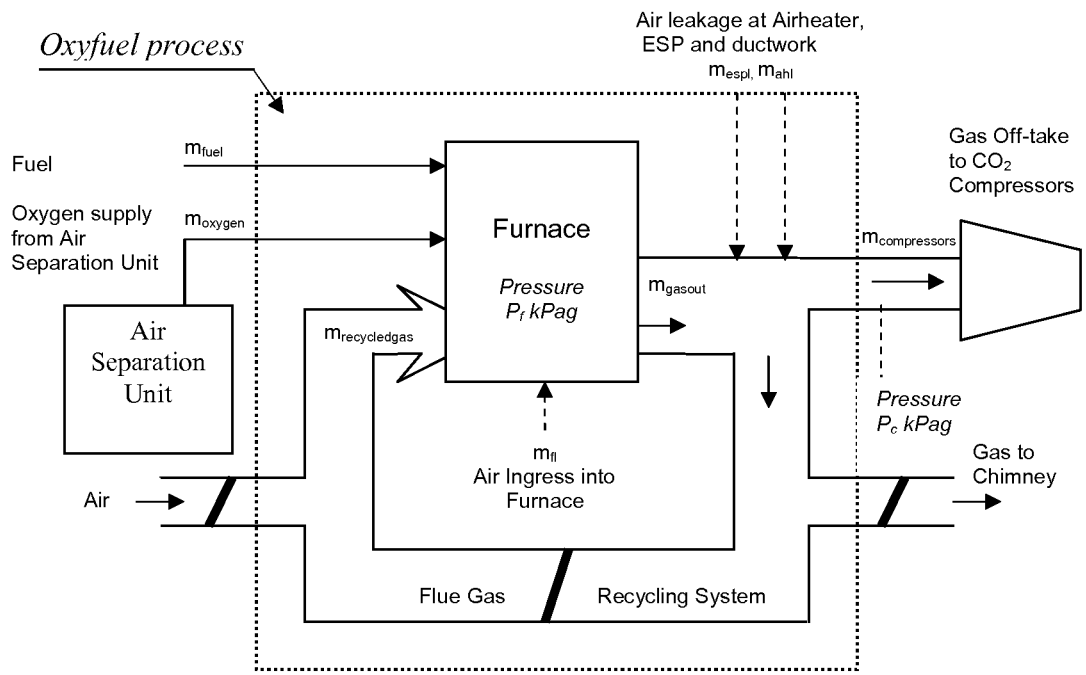
FIG. 1 is a simplified schematic of the oxyfuel cycle.

A simplified schematic of the oxyfuel cycle and processes is shown in FIG. 1.

For safe and efficient operation of the Oxyfuel cycle the following process requirements must be satisfied:

Mass flows into the furnace must simultaneously meet the following inter-related requirements:
  i) Fuel mass flow must meet Load and Boiler steam pressure requirements and may vary significantly over relatively short periods of time.
  ii) For a particular fuel flow the mass flow of re-cycled gas must be such as to maintain the correct mass flow through the Fuel Preparation and Supply system plant and for transportation of pulverised fuel into the furnace. The required flow is usually a non-linear function of fuel flow.
  iii) Oxygen mass flow must be sufficient to provide complete combustion of fuel entering the furnace.
  iv) For designs where oxygen is mixed with re-cycled gas upstream of the Fuel Preparation and Supply system plant the concentration of oxygen in the mixture must be maintained at an appropriate and safe level in order to avoid potential explosions.

In addition to the mass flow requirements the system must also meet the following requirements:

The Furnace pressure must be maintained at a value slightly below atmospheric (~−0.05 to −0.1 kPag is typical) in order to avoid leakage of unburned fuel and combustion products into the boiler house.

The supply pressure of gas to the $CO_2$ compressors must remain within an acceptable pressure range in order to ensure efficient and stable operation of the compressors.

Controls must operate such that a loss rapid start-up or shut-down of $CO_2$ compressors does not induce pressure excursions likely to cause safety issues or to damage the fabric of the furnace or associated ductwork.

Controls must operate such that a loss or partial loss of ignition within the furnace does not induce pressure excursions likely to cause safety issues or to damage the fabric of the furnace or associated ductwork.

In designing the oxyfuel plant and in the development of operating Procedures a convenient assumption is that that the compressors will take a fixed fraction ($\alpha$) of gas mass flow from the furnace with the remaining flow being recycled to the combustion system. Depending on the design of the plant's oxygen injection system, this fraction may be set at around 30-35% of the total re-circulated mass flow before the $CO_2$ compressor extraction point.

In particular the invention recognises that the following variations all cause significant changes in the fraction of re-cycled gas flow extracted by the compressors necessary to maintain the correct value of furnace pressure:—
  fuel flow
  Furnace leakage flow due to furnace pressure changes
  Air Heater leakage flow due to seal wear and seal to seal variations in a rotary type Air-Heater
  leakage flow into the furnace exit gas in plant areas such as the ducting, ESP, FGD, Direct Contact Coolers (DCC), Fans In particular the invention recognises that these leakage factors cannot be measured directly and describes the principles and design of control systems which overcome these issues whilst simultaneously meeting other operating requirements outlined in previous sections.

These functional design factors are considered in Table 1, which makes a comparison of the possible control methodologies that may be applied for conventional air firing and oxyfuel mode of operation to assist in an understanding of the functional structures and principles of the invention.

TABLE 1

Comparison of Controls Required for Conventional Air Firing and Oxyfuel mode of Operation:

| Item | Process Variable to be Controlled | Control Method | |
|---|---|---|---|
| | | Conventional Air Firing Mode | Oxyfuel Mode |
| 1 | Fuel Firing rate | Established fuel firing rate controls. Control scheme calculates required Total Combustion Air flow for use in FD fan controls (Item 3) | Established fuel firing rate controls Combined with additional model based control $CO_2$ Compressor extraction fraction $\alpha_f$ used as Feedforward term in CO2 compressor control. (Item 2 in Table 1) FGR system re-cycled mass flow control compensation to setpoint (Item 5 in Table 1) O2 mass flow setpoint for Oxygen Injection flow control (Item 6 in Table 1) Compressor Supply Pressure Control compensation to setpoint (Item 7 in Table 1) |
| 2 | Furnace Pressure | ID Fan (speed or speed and control damper or control damper) | Compressor Extraction (via speed or speed and control damper or control damper) and optionally with Chimney vent control dampers and optionally with FD air inlet control dampers |

TABLE 1-continued

Comparison of Controls Required for Conventional Air Firing and Oxyfuel mode of Operation:

| Item | Process Variable to be Controlled | Control Method | |
|---|---|---|---|
| | | Conventional Air Firing Mode | Oxyfuel Mode |
| 3 | Total Combustion Air Flow | FD Fan (via speed or speed and control damper or control damper) | N/A (no direct measurements available) |
| 4 | Oxygen content of furnace exit gas | Trim to FD Fan control | Trim to Oxygen supply controls (see below) |
| 5 | Recycled Gas Flow to Combustion system | N/A | FGR damper and/or FD fan (via speed or speed and control damper or control damper) |
| 6 | Oxygen Injection Flow | N/A | Oxygen supply control damper Optionally with integration into UK patent application no 1018227.7 |
| 7 | Compressor Supply Pressure $P_c$ | N/A | ID fan (via speed or speed and control damper or control damper) |

Figure 2:
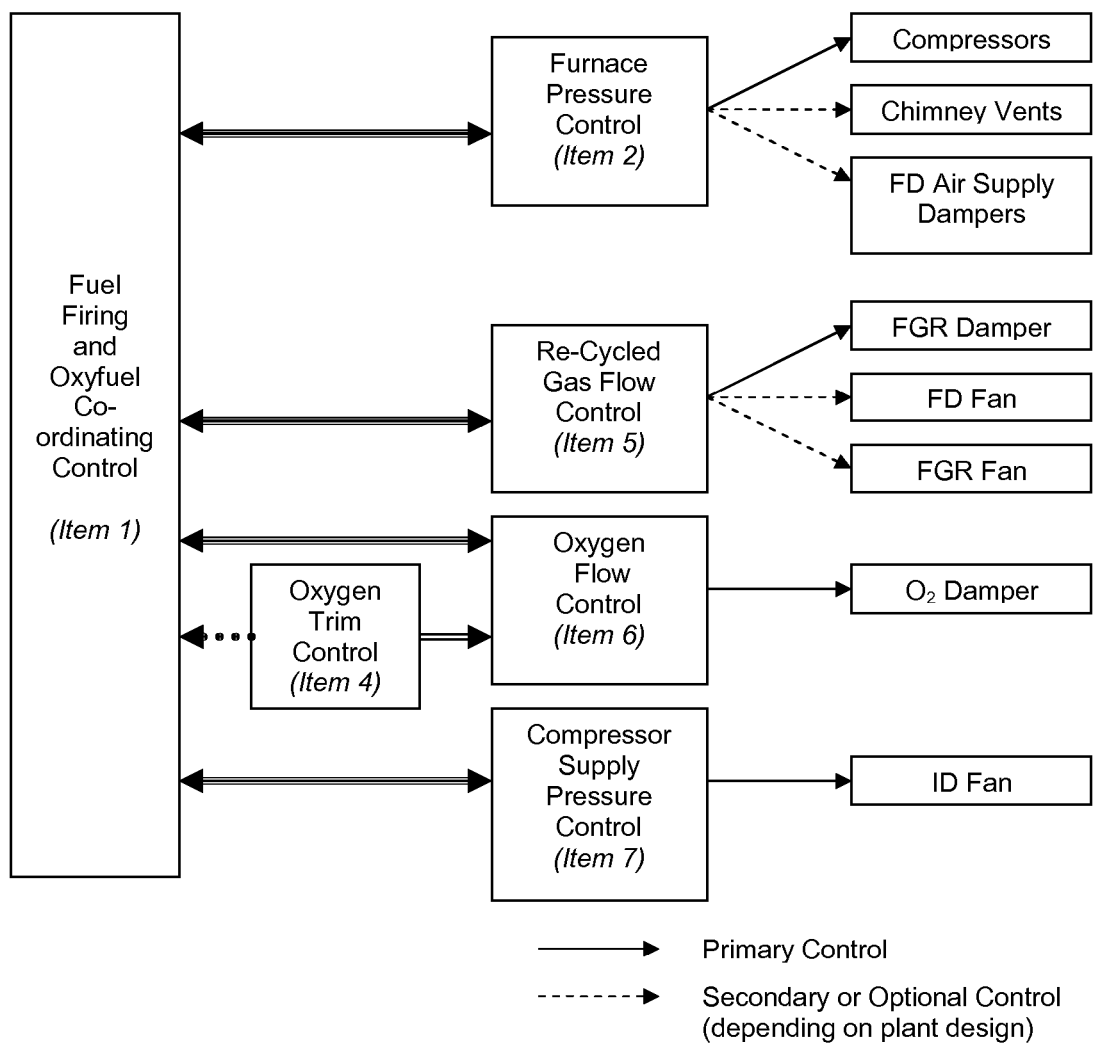
FIG. 2 is a general schematic of an embodiment of overall control system for the oxyfuel cycle.

A general schematic of an embodiment of overall control system applying as control parameters modulation of those process variables identified in table 1 is shown in FIG. 2. In the embodiment a range of possible control parameters based on a range of possible process variables is considered.

As will be understood, the invention at its most fundamental makes use of the $CO_2$ compressors for control of furnace pressure (item 2 in Table 1). At its broadest, the invention is a control method and system based at least on control of this process variable. Other process variables, such as but not limited to those additionally identified in FIG. 2, may additionally be used separately or in any combination to optimize dynamics of operation.

The process control method exemplified in FIG. 2 and the more detailed discussion of some of the particular process controls below will be understood as an example of a possible implementation of those general principles.

In particular the example recognises the value of additional de-coupling and co-ordination between control loops due to the increased level of interaction caused by the presence of gas re-cycling in oxyfuel mode.

In particular the example recognises that the co-ordinating and de-coupling function may be achieved in practice by the use of the oxyfuel co-ordinating control or by partial devolvement of this function to the individual control loops.

The function of each part of the overall control design exemplified in FIG. 2 is on that basis considered in detail below.

Oxyfuel Mode Co-ordinating Control (Item 1 in Table 1)

The main function of this part of the overall control design is to ensure that individual control loops for each specific function such as furnace pressure and re-cycled gas flow operate in a coherent and stable fashion producing fast, accurate response to changes in operating conditions.

Figure 3:
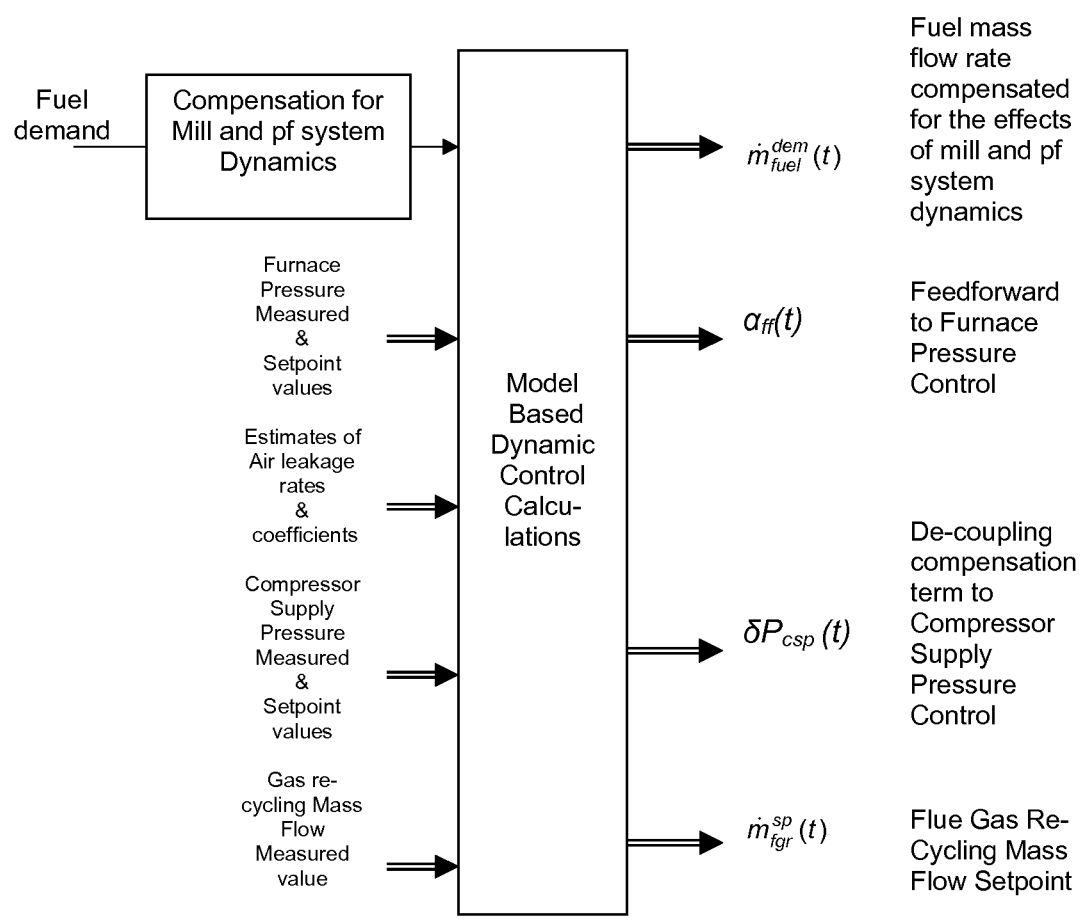
FIG. 3 is a schematic of the principles of oxyfuel mode co-ordinating control.

The main functions of this control are shown in FIG. 3.

Furnace Pressure Control (Item 2 in Table 1)

Figure 4:
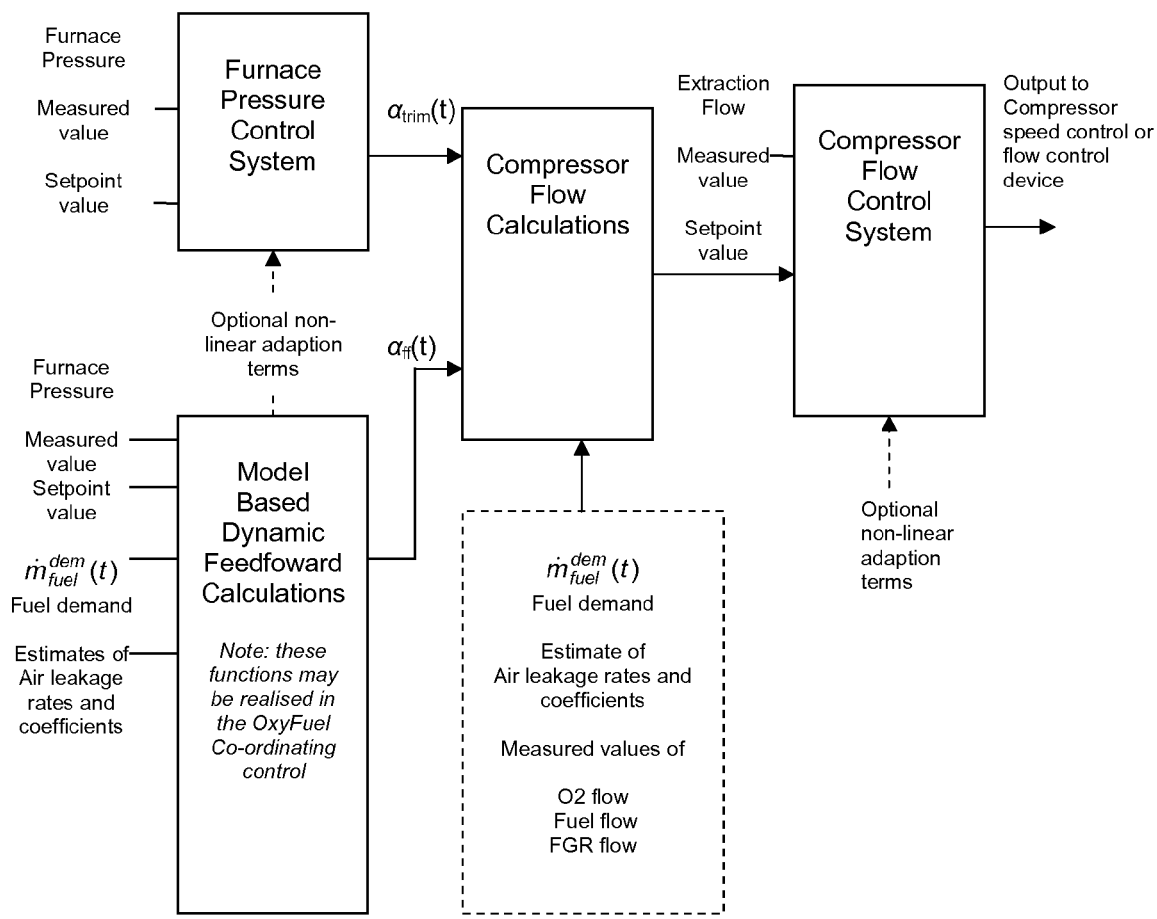
FIG. 4 is an outline schematic of the principles of oxyfuel mode furnace pressure control using the $CO_2$ compressor(s)

A generalised schematic showing the Principle of the Invention and use of the $CO_2$ compressors for control of furnace pressure is outlined in FIG. 4.

Figure 5:
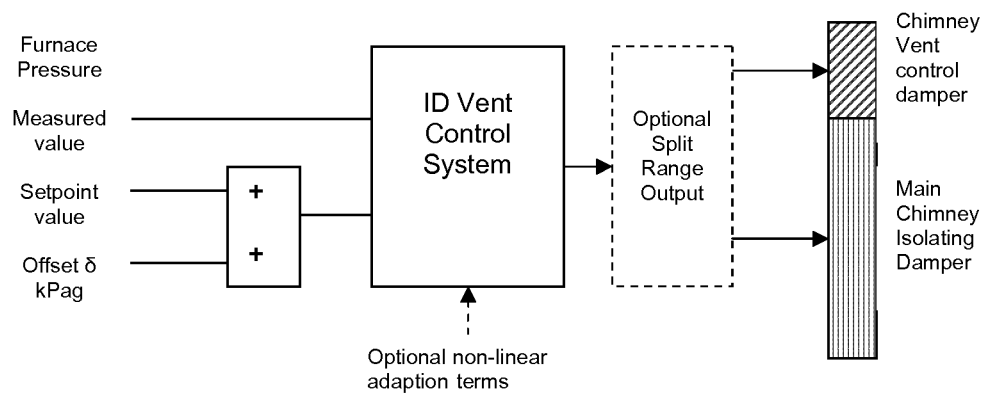
FIG. 5 is a schematic of the principles of a chimney vent control method for control of furnace pressure.
Figure 6:
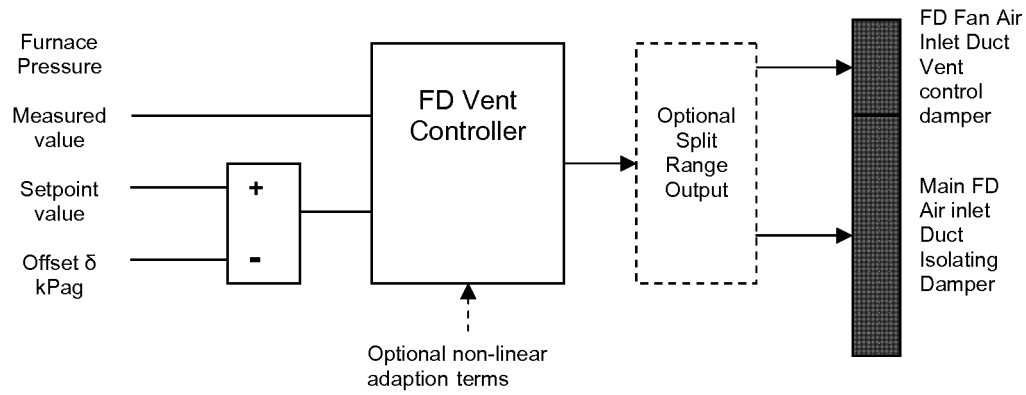
FIG. 6 is a schematic of the principles of a FD fan air inlet supply vent control method for control of furnace pressure.

The following specific observations are made in relation to this aspect of the example embodiment:

that use of the ID fan for Furnace Pressure control is no longer effective for operation in oxyfuel mode;

that effective control of furnace pressure may be achieved by modulating the mass flow of gas through the compressors;

that this fundamental principle could optionally be achieved as a simple pressure control loop adjusting the compressor speed or an inlet flow control device or by a number of functionally related methods;

that dynamic performance may be improved by the optional inclusion of a manifestation of feedforward type control within the invention such as exemplified in FIG. 4;

that dynamic performance may be improved by the optional inclusion of non-linear compensation terms exemplified in FIG. 4;

that air leakage is of importance in determining both the value of fractional flow ($\alpha$) and therefore extraction flow required to maintain the correct value of Furnace pressure and also its effect and importance in terms of pressure sensitivity and therefore tunings of the Furnace Pressure control system;

that ID vent control, such as exemplified in FIG. 5, may be optionally incorporated to minimise positive pressure excursions resulting from events such as a rapid increase in firing rate, loss or partial loss or rapid partial shutdown of one or more $CO_2$ compressors;

that FD vent control, such as exemplified in FIG. 6, may be optionally incorporated to minimise negative pressure excursions resulting from events such as a rapid decrease in firing rate, start-up or rapid increase in speed or power of one or more $CO_2$ compressors;

that for negative furnace pressure excursions invention could be realized by an additional rich in CO2 gas injection instead of air intake vent modulation control.

A value for the feedforward term may be estimated by one of two methods in particular and appropriate code developed within the control system.

In a first alternative method a direct calculation of the feedforward term may be made using appropriate equations to model the contributing factors, for example including Oxygen injection upstream of Fuel Preparation and Supply system plant and downstream of Fuel Preparation and Supply system (i.e. burners or windbox).

A suitable algorithm may be developed that uses estimates (or design values) for airheater and ducting, ESP, FGD, DCC leakage mass flow rates and for furnace leakage factor k in conjunction with the setpoint value for furnace pressure control which is typically −5 kPag Fuel mass flow rate may not always be measurable in which case an estimate based on demanded fuel value taking into account the dynamic response of the Fuel Preparation and Supply system, or pulverised fuel silo in the case of indirect firing, may be used The preferred implementation of this method is by direct coding of equations within the control system since this allows the terms within the calculation to be updated either through direct measurement or from off-line data obtained as part of plant performance investigations.

In a second alternative method plant tests are conducted to identify the value feedforward required to maintain the setpoint pressure at various firing rates. These values are then entered into a characterisation block within the control system such that the feedforward term is set as a function of fuel flow determined by calculation or plant test data.

Chimney and FD Fan Air Inlet Duct Vent Controls

These options allow account to be taken of the following for example:
  that positive going excursions in furnace pressure may be reduced by venting gas flow to the chimney by controlled opening of the chimney isolation damper assembly;
  that negative going excursions in furnace pressure may be reduced by admitting air to the system by controlled opening of the FD inlet air supply ductwork isolation damper assembly;
  that, since relatively small values of mass flow are normally required to correct pressure excursion, improved control may be obtained by the (optional) use of a by-pass damper arrangement rather than use of the main isolating dampers.
  that for large scale deviations the use of 'split range' control whereby the small vent dampers are opened first followed by the large isolation dampers when necessary.

Outline schematics for the vents and associated control designs are shown in FIGS. 5 and 6, respectively showing an outline schematic of a chimney vent control method for control of furnace pressure and an outline schematic of FD fan air inlet supply vent control method for control of furnace pressure.

Re-cycled Gas Mass Flow Control (Item 5 in Table 1)

This option allows account to be taken of the following for example:
  that in order to minimise Works Power the FGR flow control damper and FGR Fan speed (or FD fan speed) are controlled to provide the necessary FGR mass flow rate at the minimum fan speed and maximum damper opening commensurate with maintaining acceptable levels of flow control by movement of the damper;
  that, where FD Fan inlet supply vent control is employed (see Item 2 in Table 1,) the design and control of the FGR system and damper must maintain a sub-atmospheric pressure at the junction between the external air supply duct and the FD fan inlet.

Figure 7:
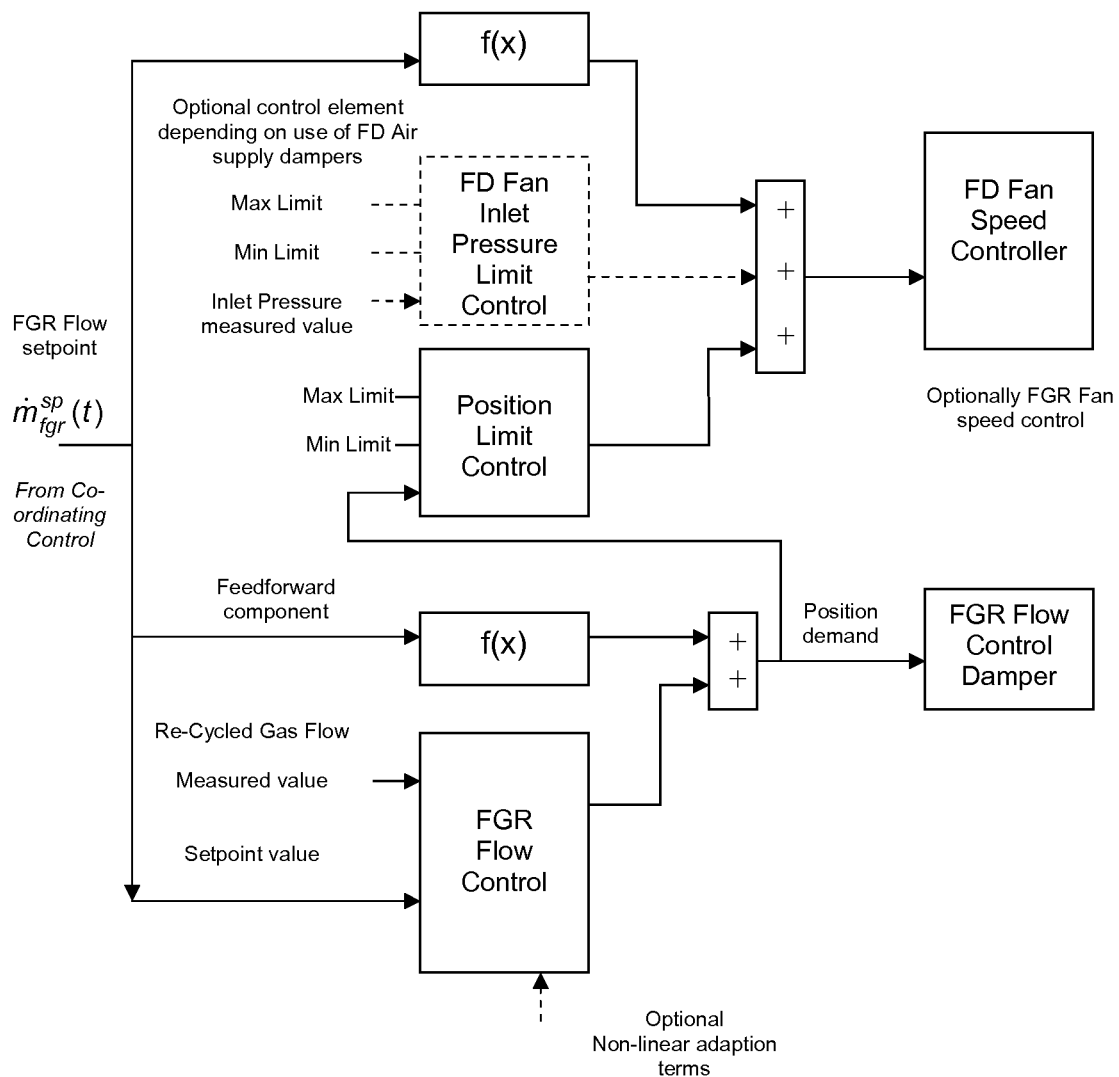
FIG. 7 is a schematic of re-cycled gas flow control.

An outline schematic for recycled gas flow control is shown in FIG. 7.

Oxygen Injection Controls (Item 6 in Table 1)

This option allows account to be taken of the following for example:
  that accurate control of oxygen injection and concentration is essential for both combustion and safety reasons;
  that the importance of process dynamics associated with the Fuel Preparation and Supply system and pulverised fuel transport system in achieving accurate control of Oxygen concentration within the system is recognised.

Figure 8:
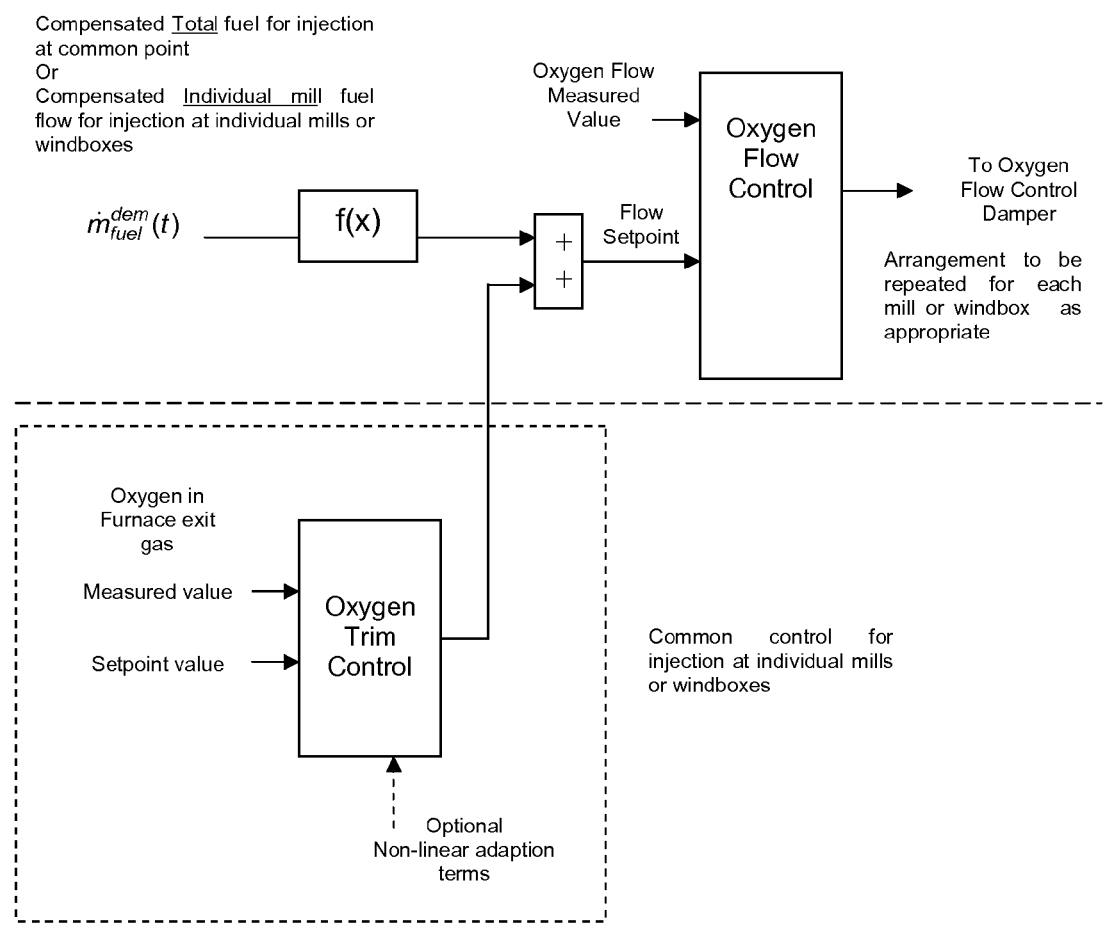
FIG. 8 is a schematic of oxygen control.

An outline schematic for oxygen flow control is shown in FIG. 8.

Compressor Supply Pressure Control (Item 7 in Table 1)

Figure 9:
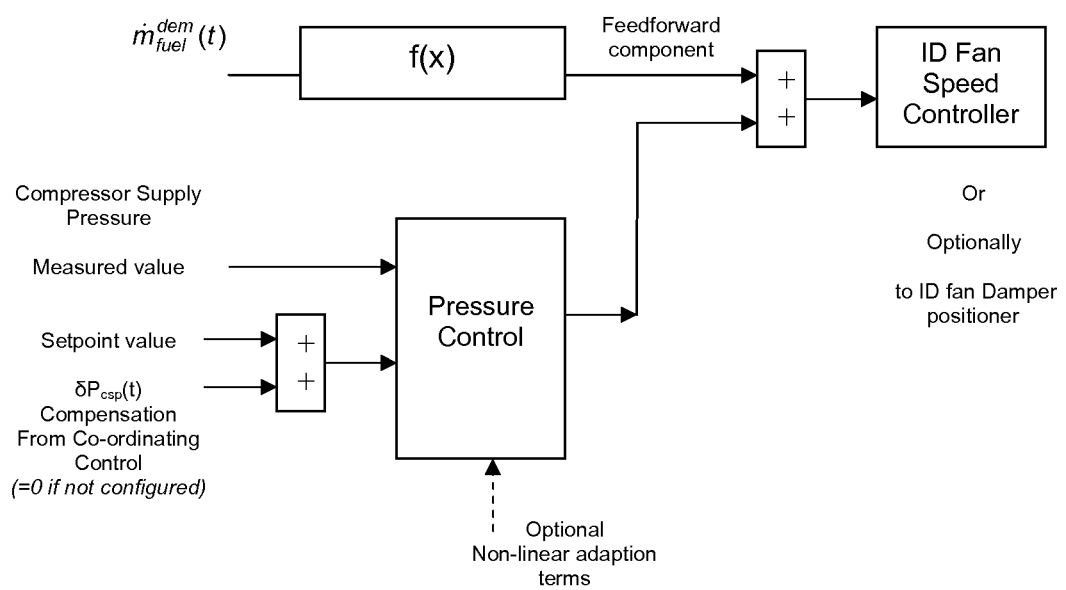
FIG. 9 is a schematic of compressor supply pressure control.

This option allows account to be taken of the following for example:
  that control of supply pressure to the compressors is achieved by modulation of gas flow through the ID fan either by changing fan speed or by changing ID fan damper position or by a combination of both, or by changing position of an additional damper downstream of the ID fan;
  that the close coupling and interaction with other control elements requires effective co-ordination of control between schemes, this being achieved by the oxyfuel mode co-ordinating control described previously.
  that compensation to de-couple the interaction between elements may be applied to the pressure controller as shown in FIG. 9 or alternatively to the feedforward element of the design or alternatively to both the feedforward and pressure control elements.

An outline schematic for compressor supply control is shown in FIG. 9.

Figure 10:
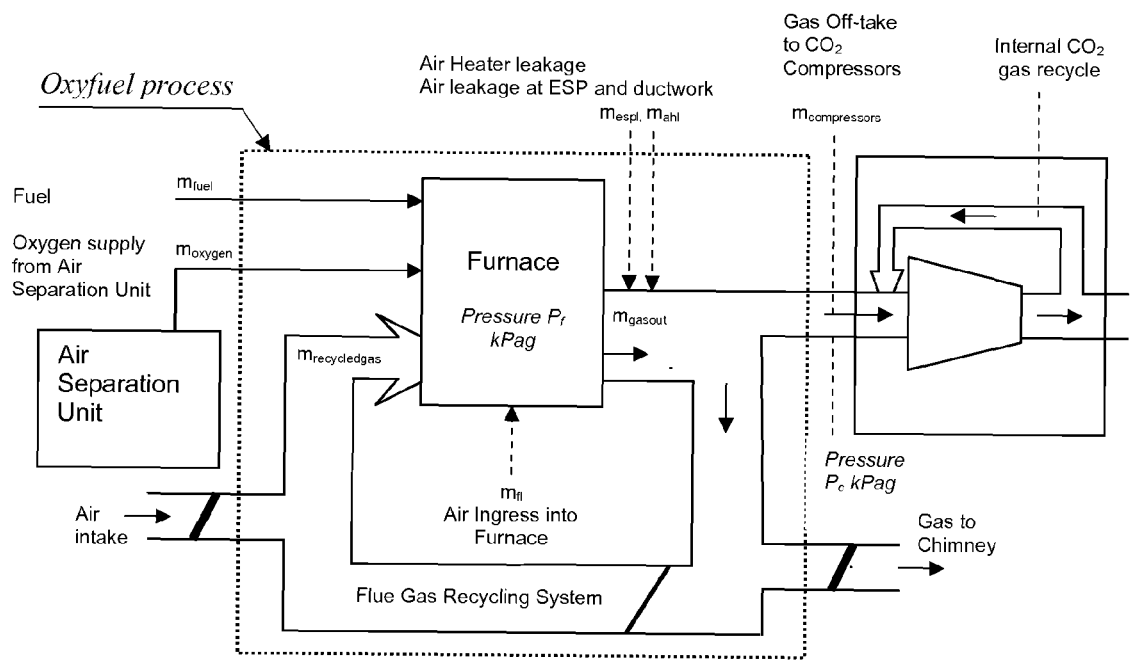
FIG. 10 is a schematic of oxyfuel system with $CO_2$ compression recycle

An outline schematic of an oxyfuel system with $CO_2$ compression recycle is shown in FIG. 10.

Figure 11:
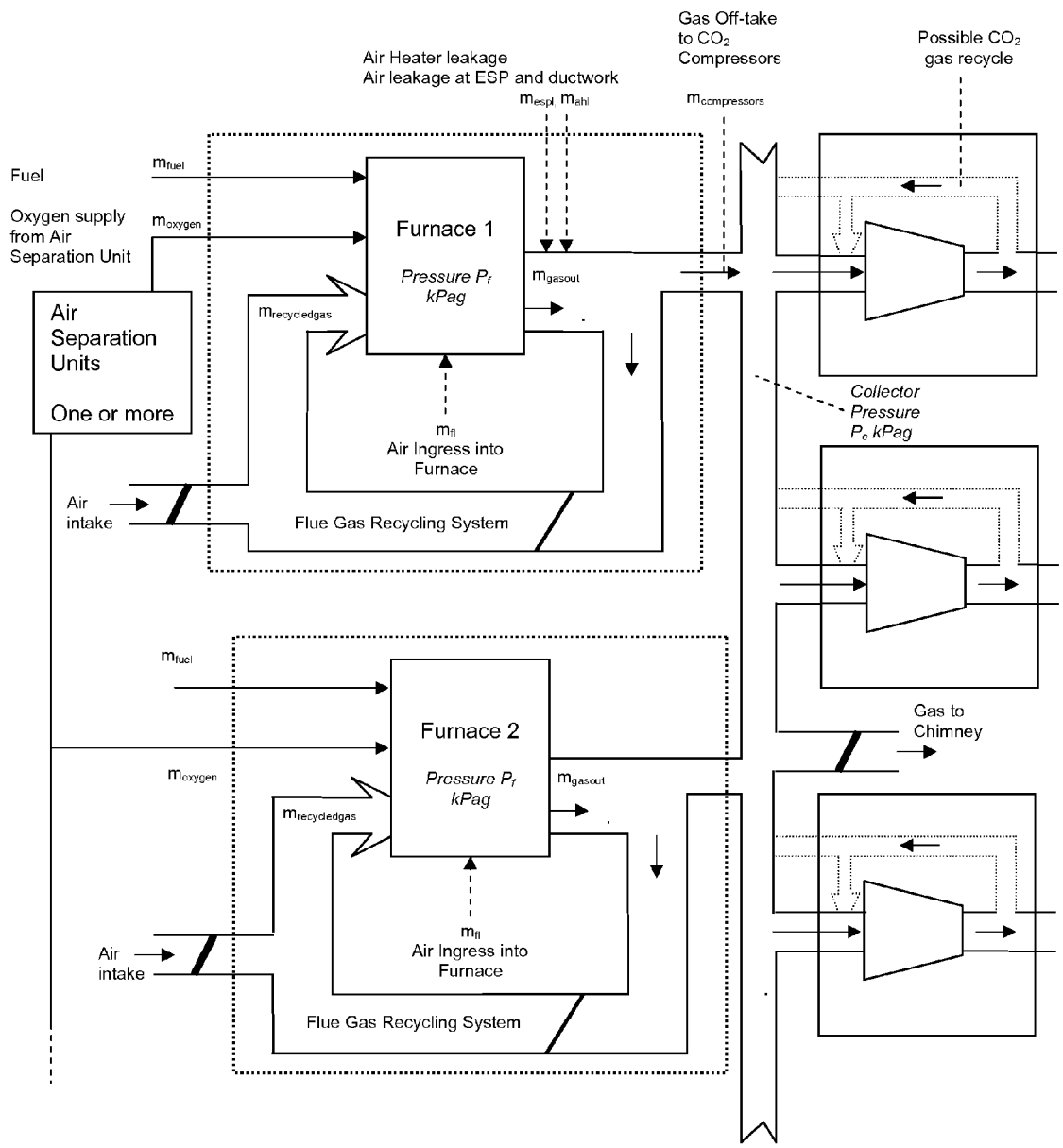
FIG. 11 is a schematic of multi oxyfuel boiler unit arrangement connected with common flue gas collector.

FIG. 11 is a schematic of schematic of a multi oxyfuel boiler unit arrangement connected with common flue gas collector.

Figure 12:
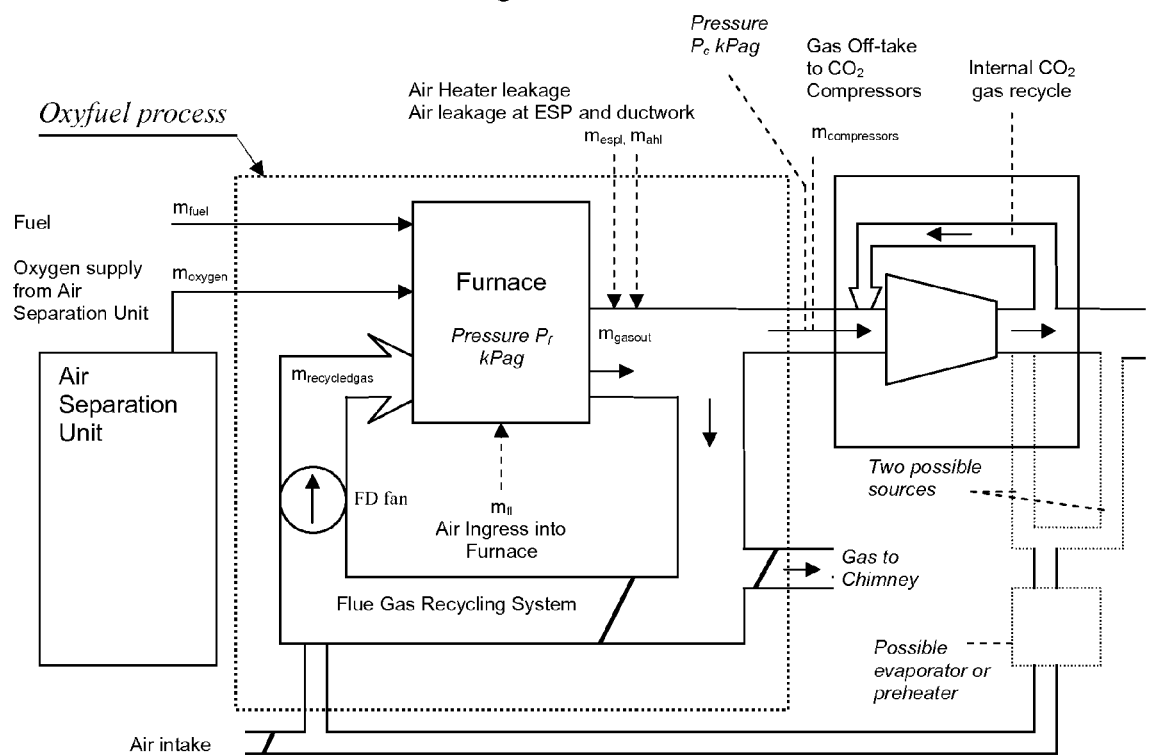
FIG. 12 is a schematic of rich in $CO_2$ gas recycle and air intake for used for negative furnace pressure.

FIG. 12 is a schematic of rich in $CO_2$ gas recycle and air intake for used for negative furnace pressure.

The invention claimed is:

1. A boiler plant apparatus comprising:
  a power generation system having a furnace volume;
  an oxyfuel firing system for oxyfuel combustion of fossil fuel in the furnace volume;
  an induced draft fan with modulated vent damper to remove gases from the furnace volume;
  a compression system, disposed downstream from the induced draft fan, configured to compress gases exhausted from the furnace volume after combustion, wherein the compression system includes at least one CO2 compressor;
  a control system adapted to control pressure within the furnace volume by controlling the compression system to cause modulation of the mass flow of exhaust gases through the at least one CO2 compressor of the compression system downstream from the furnace volume without continuously venting the exhaust gases to the atmosphere, and extracting a fractional amount of the exhaust gases to be recycled in the oxyfuel firing system; and
  a forced draft fan to force the flue gases into the furnace volume;
  wherein the pressure within the furnace volume is dynamically varied by the compression system modulating the mass flow of the exhaust gases through the at least one CO2 compressor based on changes in operating requirements of the oxyfuel combustion in the furnace volume in response to changes in load demand by controlling at least one of a speed of the CO2 compressor or a damper of the CO2 compressor to thereby vary the fractional amount of the exhaust gases to be recycled in the oxyfuel firing system based on variations of at least one of a fuel flow or a furnace leakage flow.

2. An apparatus in accordance with claim 1 wherein the control system is adapted to dynamically adjust the furnace pressure by real time determination of a desired mass flow rate of gas through the compression system being a mass flow rate which will achieve or maintain a desired furnace pressure and by dynamic adjustment of the mass flow rate to the desired mass flow rate to achieve or maintain the desired furnace pressure.

3. An apparatus in accordance with claim 1 provided as part of a thermal power plant.

4. An apparatus in accordance with claim 1 wherein the compression system comprises a bypass that allows all or some of the CO2 to bypass the compression system.

5. A method of operation of a boiler plant having a furnace volume, an oxyfuel firing system for oxyfuel combustion of fuel in the furnace volume, a forced draft fan to recycle flue gases into the furnace volume, an induced draft fan with modulated vent damper disposed downstream from the furnace volume to remove gases from the furnace volume, and a compression system disposed downstream from the induced draft fan for compression of gases exhausted from the furnace volume after combustion, comprising:

conducting oxyfuel combustion of fuel in the furnace volume;

controlling pressure within the furnace volume by controlling the compression system to cause modulation of mass flow of exhaust gases through at least one CO2 compressor of the compression system downstream from the furnace volume without continuously venting the exhaust gases to the atmosphere;

downstream of the induced draft fan, extracting a fractional amount of the exhaust gases to be recycled in the oxyfuel firing system; and compressing the exhaust gases for storage by using the at least one CO2 compressor disposed downstream from the induced draft fan;

wherein the pressure within the furnace volume is dynamically varied by the compression system modulating the mass flow of the exhaust gases through the at least one CO2 compressor based on changes in operating requirements of the oxyfuel combustion in the furnace volume in response to changes in load demand by controlling at least one of a speed of the CO2 compressor or a damper of the CO2 compressor to thereby vary the fractional amount of the exhaust gases to be recycled in the oxyfuel firing system based on variations of at least one of a fuel flow or a furnace leakage flow;

controlling the induced draft fan vent to minimize positive pressure excursions resulting from a rapid increase in firing rate, loss or partial loss or rapid partial shutdown of the at least one CO2 compressor; and controlling the forced draft fan vent to minimize negative pressure excursions resulting from a rapid decrease in firing rate, start-up or rapid increase in speed or power of the at least one CO2 compressor.

6. A method in accordance with claim 5 wherein the step of modulating the mass flow of gas through the at least one CO2 compressor is effected by adjusting the compressor speed as a means to effect dynamic control and modulation of furnace pressure.

7. A method in accordance with claim 5 wherein the step of modulating the mass flow of gas through the at least one CO2 compressor is effected by adjusting an inlet flow control device.

8. A method in accordance with claim 5 further comprising dynamic adjustment of furnace pressure by real time determination of a mass flow rate to achieve or maintain a desired furnace pressure and by dynamic adjustment of the mass flow rate to the desired mass flow rate to achieve or maintain the desired furnace pressure.

9. A method in accordance with claim 8 comprising dynamic adjustment of furnace pressure by real time determination of being a mass flow rate which will achieve or maintain a desired furnace pressure and by dynamic adjustment of the mass flow rate to the desired mass flow rate to achieve or maintain the desired furnace pressure in conjunction with dynamic adjustment of one or more of the following process parameters, in any combination, to optimize dynamic firing performance:

fuel firing rate;
  oxygen content of furnace exit gas;
  recycled gas flow to the combustion system;
  oxygen injection flow; or
  compressor supply pressure.

\* \* \* \* \*

UNITED STATES PATENT AND TRADEMARK OFFICE
CERTIFICATE OF CORRECTION

PATENT NO. : 9,593,846 B2
APPLICATION NO. : 13/992989
DATED : March 14, 2017
INVENTOR(S) : Konrad Jerzy Kuczynski and David James Adams It is certified that error appears in the above-identified patent and that said Letters Patent is hereby corrected as shown below:

On the Title Page

Assignees (73):
Delete "DOOSAN POWER SYSTEMS LIMITED, Crawley (GB); POWER SYSTEMS SYNETICS LIMITED, Horsham (GB)"
Insert --DOOSAN BABCOCK LIMITED, Crawley (GB); POWER SYSTEMS SYNECTICS LIMITED, Horsham (GB)--

In the Claims

In Column 14, Line 51, Claim 1, please insert --recycled-- before "flue gases"

Signed and Sealed this
Twentieth Day of February, 2018

Andrei Iancu
*Director of the United States Patent and Trademark Office*